United States Patent [19]

Fujimura

[11] 4,368,680
[45] Jan. 18, 1983

[54] ELECTRONIC SEWING MACHINE WITH MULTI-PATTERN SELECTING SYSTEM

[75] Inventor: Toshiro Fujimura, Musashino, Japan

[73] Assignee: Janome Sewing Machine Co. Ltd., Tokyo, Japan

[21] Appl. No.: 115,290

[22] Filed: Jan. 25, 1980

Related U.S. Application Data

[63] Continuation of Ser. No. 35,505, May 2, 1979, abandoned.

[30] Foreign Application Priority Data

May 12, 1978 [JP] Japan .................................. 53-55672

[51] Int. Cl.³ ............................................ D05B 3/02
[52] U.S. Cl. ................................................ 112/158 E
[58] Field of Search ........... 112/158 E, 158 F, 121.11, 112/121.12; 318/567, 569

[56] References Cited

U.S. PATENT DOCUMENTS

| | | | |
|---|---|---|---|
| 4,005,664 | 2/1977 | Garron | 112/158 E |
| 4,016,821 | 4/1977 | Minalga | 112/158 E |
| 4,104,976 | 8/1978 | Landau, Jr. et al. | 112/121.11 |
| 4,122,786 | 10/1978 | Tanimoto et al. | 112/158 E |
| 4,177,744 | 12/1979 | Wurst et al. | 112/158 E |
| 4,186,675 | 2/1980 | Yamashita et al. | 112/158 E |
| 4,280,424 | 7/1981 | Carbonato et al. | 112/158 E |

*Primary Examiner*—Peter P. Nerbun
*Attorney, Agent, or Firm*—Michael J. Striker

[57] ABSTRACT

An electronic sewing machine incorporating a microcomputer including an electronic memory storing a number of stitch pattern data groups as well as scanning means for scanning and displaying the various stitch patterns on an indicator display. A potentiometer knob actuates the microprocessor for providing the various stitch patterns. The scanning means can be an electric motor or a pulse generator.

5 Claims, 2 Drawing Figures

FIG_1
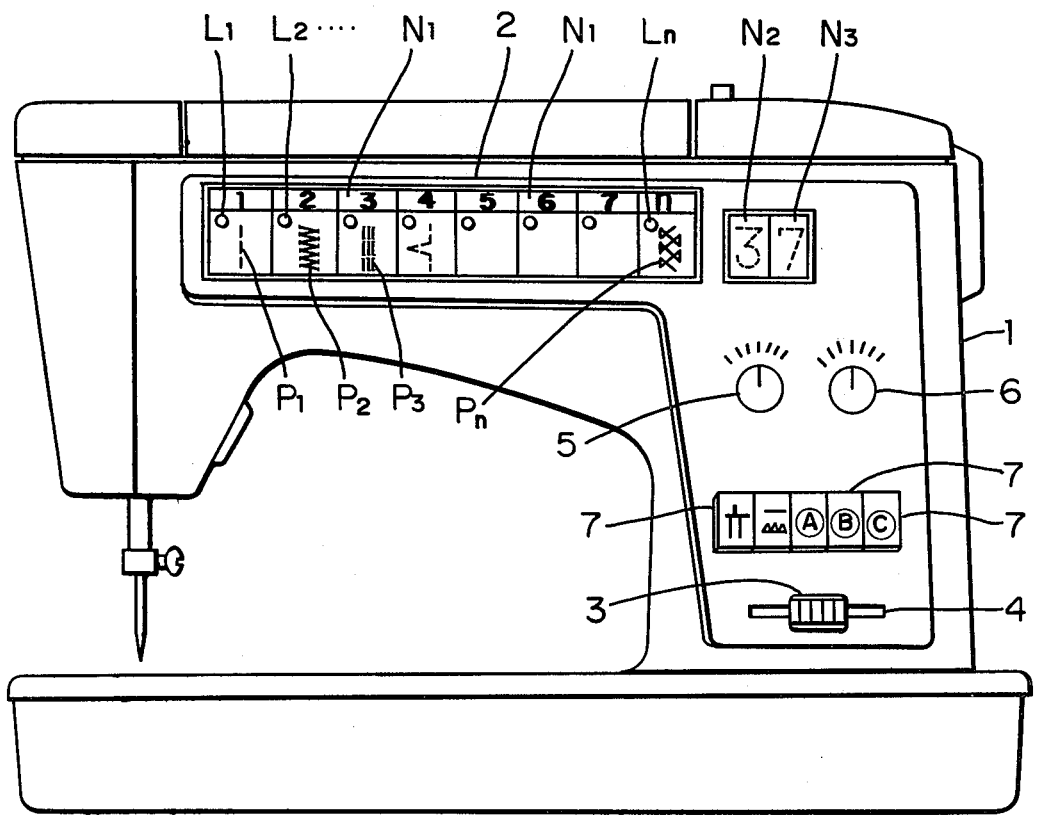
A ··· INV
B ··· MEM
C ··· CAN

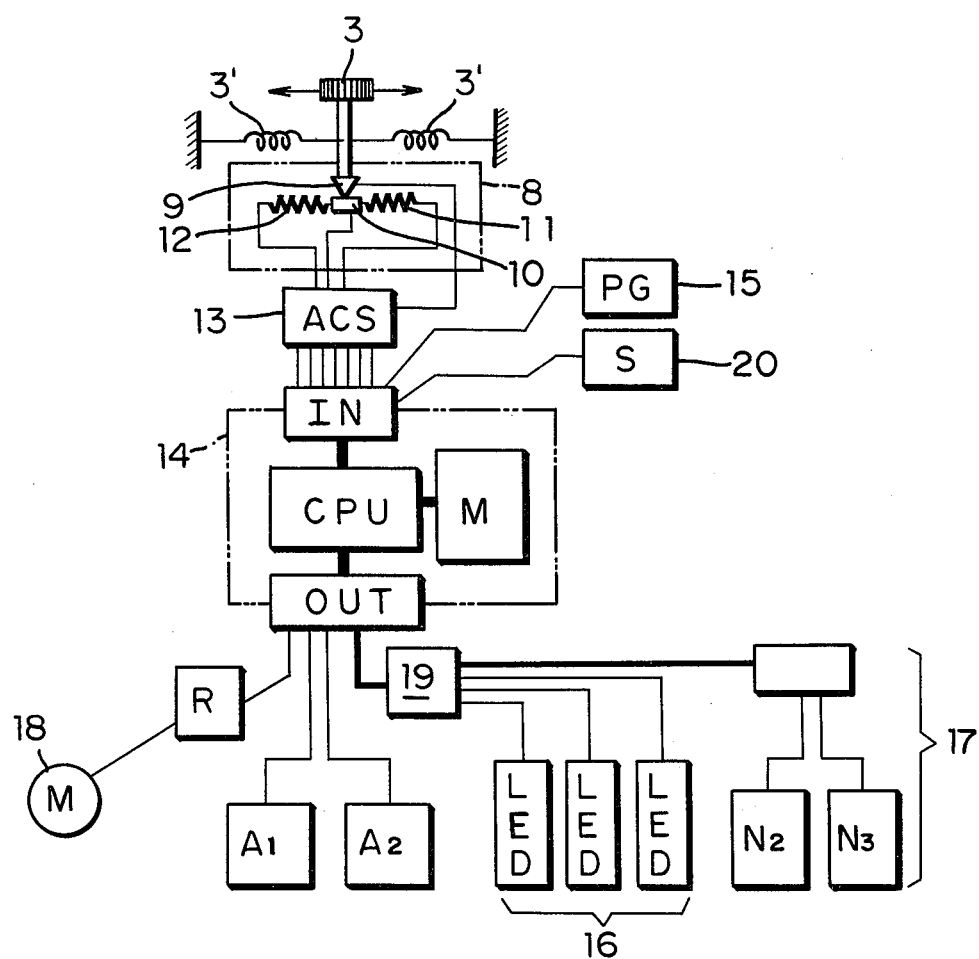
FIG_2

ELECTRONIC SEWING MACHINE WITH MULTI-PATTERN SELECTING SYSTEM

This is a continuation of application Ser. No. 035,505, filed May 2, 1979, now abandoned.

The present invention relates to a pattern selecting system for an electronic sewing machine storing a lot of patterns. Especially the invention provides a pattern selecting system which is operated by a single operating element to sequentially indicate the specific pattern or pattern numbers which are arranged on the pattern selection panel and the extra patterns or pattern numbers which are arranged not on the panel but on the concealed part of the sewing machine such as on the inner side of the top plate of the sewing machine or in the service manual of the machine.

Generally the prior art of this field provides a pattern selecting system in which a lot of patterns, indicating lamps and operating switches are arranged on the machine panel. Such a design of the pattern selecting system is relatively costly in production and disharmonizes the outer appearance of the sewing machine, is also troublesome in selective operation of the operating switches.

The present invention has been provided to eliminate such disadvantages of the prior art.

It is a principal object of the invention to provide a pattern selecting system of simple structure, It is another object of the invention to provide a pattern selecting system for easy operation, and, It is still another object of the invention to improve the design of the pattern selecting system of the prior art.

The other features and advantages of the invention will be apparent from the following description of the actual embodiment in reference to the attached drawings.

BRIEF DESCRIPTION OF THE DRAWINGS

FIG. 1 shows a front elevational view of a sewing machine of the invention, and

FIG. 2 shows a block diagram of a control circuit of the invention.

DESCRIPTION OF THE INVENTION

Referring now to FIG. 1 of the attached drawing, the reference numeral 1 denotes a housing of an electronic sewing machine having a pattern selection panel 2 attached on the front face of the sewing machine. The pattern selection panel carries a row of pattern indicators $P_1-P_n$, for example light emitting diodes LED each in association with the pattern indicators and pattern numbers $N_1$ each in association with the pattern Indicators and the light emitting diodes. $N_2$ and $N_3$ are pattern number indicator displays by way of light emitting diodes. The reference numeral 3 denotes a manually operated pattern selecting knob which is slidable along an elongated guide slot 4 formed in the panel 2. The reference numerals 5 and 6 are manually operated dials for adjusting the lateral swinging movement of the needle and the feeding amount of the feed dog of the sewing machine respectively. The numeral 7 collectively denotes manually operated function keys having marks and letters provided thereon for setting the sewing machine to using the twin-needle to dropping the feed dog into the inoperative position, to producing the inverted patterns, to producing inverted patterns, to memorizing combined patterns, to cancelling the memory of the sewing machine, etc.

FIG. 2 shows a pattern selecting system provided on the inner side of the panel 2. The manually operated knob 3 is normally positioned in the neutral point 10 of resistors 11, 12 by means of return springs 3', 3'. The resistors may be replaced by a pressure sensitive resistor or a variable capacitor. A pair of push buttons can be selective pushed in relation to the pressure sensitive resistor means to operate the automatically operated switch means in each time the push buttons are selectively pushed. If the knob 3 is moved in the right or left direction against the action of the springs 3', 3', the contact 9 is moved from the neutral point 10 and is slidable on the resistor 11 or 12. As the result, an automatic operation switch (ACS, 13) or an automatic pattern selecting device is operated by the resistance values which are varied as the contact 9 is moved on the resistor 11 or 12, thereby operating the switching circuits (not shown) sequentially for example from a higher number to a lower number thereof corresponding to the pattern numbers $N_1$ at a speed in accordance to the operation setting of the knob 3. The knob 3 may be replaced by a pair of push buttons such as short-circuiting push buttons which are provided against the resistors 11 and 12 respectively. In this case, each time the push buttons are pressed, the automatic operation switch (ACS, 13) is operated in accordance to the varied resistance values to do the same effect.

The reference numeral 14 denotes a microcomputer installed in the sewing machine. In response to the circuit number (namely the pattern number) identified by operation of the manually operated knob 3, the microcomputer 14 including a memory M produces a set of information data corresponding the pattern number $N_1$ and lights the selected one of the pattern indications ($L_1-L_n$, 16) and the pattern number indicating device ($N_2$, $N_3$, 17) at the tempo as abovementioned. In every rotation of the sewing machine by way of a machine motor, a pulse generator 15 produces a pulse to sequentially read out of the memory M the pattern data specific to the selected pattern so as to control the operation of the stitch forming instrumentalities $A_1$, $A_2$ of the sewing machine such as electro-magnetic actuators for controlling the needle positions and feeding amounts.

In this invention, the pattern indications $P_1-P_n$ on the panel 2 are those very often selected by the machine operator. Many other patterns, which are not so often used, are indicated on the inner side of the top plate or in the separate service manual, and these patterns are indicated only by the pattern numbers in the pattern indicating device $N_1$, $N_3$ by operation of the knob 3 in reference to pattern indications on the inner side of the top plate or in the separate service manual.

In FIG. 2, the reference character R denotes a speed control device of the sewing machine. The reference numeral 19 denotes a lighting control circuit, and 20 denotes a power feed back sensor for controlling the needle position and the feeding amount.

In this invention, the lighting control circuit 19 may be so formed as to light any of the pattern indications $P_1-P_n$ only in its place, or to simultaneously indicate the pattern number in the pattern indication device $N_2$ or $N_2$, $N_3$.

I claim:

1. An electronic sewing machine having an electronic memory storing control data and a panel carrying a plurality of pattern indications with pattern numbers which are selectively indicated by a light, comprising separate pattern number indication means on the panel for indicating the extra pattern numbers other than the pattern numbers arranged on the panel; means manually operated to selectively indicate the pattern numbers on the panel and extra pattern numbers by way of the separate pattern number indication means; and switch means automatically operated at a speed in accordance to the operation amount of the manually operated means to sequentially indicate the pattern numbers arranged on the panel and the extra pattern numbers by way of the separate pattern number indication means.

2. An electronic sewing machine as claimed in claim 1, wherein the manually operated means is a single knob manually positioned in a neutral ineffective position by return spring means, the knob being movable in lateral directions along resistor means.

3. An electronic sewing machine as claimed in claim 1, further comprising electric circuit means operated in accordance to the movement amount of the manually operated means to selectively indicate the pattern numbers by way of a light.

4. An electronic sewing machine as claimed in claim 1 further comprising a pulse generator to produce a pulse to sequentially read out of the memory the pattern data so as to control the operation of stitch formation.

5. An electronic sewing machine having an electronic memory storing control data and a panel carrying a plurality of pattern indicators with pattern numbers which are selectively indicated by light, comprising separate pattern number indicator means on the panel for indicating the extra pattern numbers other than pattern numbers arranged on the panel; means manually operated to selectively indicate the pattern numbers on the panel and extra pattern numbers by way of the separate pattern number indicator means; and switch means automatically operated at a speed in accordance to the operation amount of the manually operated means to sequentially indicate the pattern numbers arranged on the panel and the extra pattern numbers by way of the separate pattern number indicator means, wherein the manually operated means is a single knob manually positioned in a neutral ineffective position by return spring means, the knob being movable in lateral directions along resistor means.

* * * * *